United States Patent
Boen et al.

(12) 
(10) Patent No.: US 6,185,243 B1
(45) Date of Patent: Feb. 6, 2001

(54) GLASS INDUCTION MELTING FURNACE USING A COLD CRUCIBLE

(75) Inventors: Roger Boen, St Alexandre; Armand Bonnetier, Orange; Christian Ladirat, Saint Laurent des arbres, all of (FR)

(73) Assignee: Commissariat a l'Energie Atomique (FR)

( * ) Notice: Under 35 U.S.C. 154(b), the term of this patent shall be extended for 0 days.

(21) Appl. No.: 09/214,785
(22) PCT Filed: Jul. 24, 1997
(86) PCT No.: PCT/FR97/01387
 § 371 Date: Jan. 12, 1999
 § 102(e) Date: Jan. 12, 1999
(87) PCT Pub. No.: WO98/05185
 PCT Pub. Date: Feb. 5, 1998

(30) Foreign Application Priority Data

Jul. 25, 1996 (FR) .................................................. 96 09382

(51) Int. Cl.[7] ...................................................... H05B 6/22
(52) U.S. Cl. .............................................. 373/156; 373/142
(58) Field of Search ..................................... 373/7, 27–29, 373/59, 138, 139, 146, 151, 152, 153, 155, 156, 158

(56) References Cited

U.S. PATENT DOCUMENTS

| 1,645,526 | 10/1927 | Gerth . | |
|---|---|---|---|
| 4,687,646 | * 8/1987 | Mateika et al. | 422/248 |
| 5,367,532 | * 11/1994 | Boen et al. | 373/156 |
| 5,479,438 | * 12/1995 | Blum et al. | 373/156 |

FOREIGN PATENT DOCUMENTS

| 564 693 | 11/1932 | (DE) . | |
|---|---|---|---|
| 608 476 | 3/1936 | (DE) . | |
| 938 263 | 1/1956 | (DE) . | |
| 33 16546 | 4/1984 | (DE) . | |
| 672 026 | 12/1929 | (FR) . | |
| 2 279543 | 1/1995 | (GB) | 373/156 |
| WO92/15531 | 9/1992 | (WO) . | |

* cited by examiner

Primary Examiner—Tu Ba Hoang
(74) Attorney, Agent, or Firm—Burns, Doane, Swecker & Mathis, L.L.P.

(57) ABSTRACT

A melting furnace for insulating materials is provided with a cooled crucible (10) having continuous metal side malls, a partitioned and cooled bottom (12) and at least one induction coil (28) placed under the bottom which serves as the sole heating means. The depth of the melting bath contained in the crucible and the excitation frequency of the induction coil are selected so that the depth and half of the inside radius of the crucible are less than the skin thickness of the bath.

8 Claims, 3 Drawing Sheets

GLASS INDUCTION MELTING FURNACE USING A COLD CRUCIBLE

CROSS REFERENCE TO RELATED APPLICATIONS

This application is a national phase application of PCT International Application FR97/01387 filed on Jul. 24, 1997, which claims priority to French Patent application 96 0982 filed on Jul. 25, 1996.

FIELD OF THE INVENTION

This invention relates to melting of insulating materials such as glass, by direct induction in a cold crucible.

PRIOR ART AND PROBLEMS CAUSED

Any materials may be made by melting in crucibles heated with induction. The most widely used and the simplest crucibles are made of refractory material, but this type of crucible is not compatible with all melting baths. Some materials are corrosive to refractory materials when they melt whereas others, and particularly glass, may be polluted by the refractory materials.

These materials then have to be prepared in special crucibles called "cold" crucibles which have non-polluting walls. A cold crucible is composed of metal sectors cooled by water circulation in which the material to be prepared is heated by a peripheral induction coil. Separating the crucible into sectors, or partitioning, limits temperature rises due to induction in the crucible wall, and enables direct induction heating of the material contained in the furnace.

The induction coil is composed of one or several turns usually wound around the crucible, since it is generally accepted that this arrangement gives the best performances.

German patent DE-C-33 16 546 describes a furnace with a cold metal crucible also comprising a lower induction coil placed under the bottom which is partitioned into sectors. However, this lower induction coil only forms a makeup heating element. A main induction coil is wound around the crucible which implies that the metal side walls of the crucible must also be partitioned into sectors.

British patent document No. 2 279 543 describes a pour crucible with non-partitioned side walls for smelting metal alloys, and not insulating materials, also comprising an induction coil placed under a partitioned bottom. The induction coil is designed to determine the pour temperature, this pour taking place in the middle of the induction coil, but it is not used and it is not designed to melt the entire quantity of metal contained in the crucible. The crucible is designed to be used with a main installation which melts the metal. Therefore, the induction coil is a makeup heating element. The main heating may be provided by induction, in which case either the side metal walls are partitioned, or the walls are refractory and introduce the incompatibility problems mentioned above.

German patent DE-C-564 693 describes a furnace with heating from the inside, comprising sleeves which penetrate into the melting bath through the bottom and containing induction turns. This type of furnace is complicated to make, particularly if it is to be made with cold walls.

It may be deduced from the state of the art described above that no-one has ever considered using an induction coil placed under the bottom of a crucible as the sole means of heating.

SUMMARY OF THE INVENTION

One purpose of this invention is to provide a melting furnace with a cold crucible particularly adapted to glass, which is particularly simple and inexpensive to make, while having guaranteed performances similar to those of conventional furnaces.

Another purpose of this invention is to provide such a furnace which, for a given capacity, requires less expensive components to supply the excitation voltage for the induction coil.

Another purpose of this invention is to provide such a furnace with a higher capacity making use of commercially available components to supply the induction coil excitation voltage.

Another purpose of this invention is to provide such a furnace with particularly good thermal insulation between the melting bath and the crucible walls.

This invention achieves these objectives by heating the glass only through an induction coil placed under the bottom. Since no induction coil acts through the side wall of the crucible, this side wall may be continuous, in other words not electrically partitioned, which makes it particularly easy to manufacture.

The average diameter of the induction coil is approximately half the diameter of an induction coil that would conventionally be wound around the crucible, which significantly reduces its inductance and therefore its excitation voltage. The components supplying the excitation voltage can therefore be less expensive for a given crucible diameter, or existing components may be used to make a crucible with a larger diameter.

Moving the periphery of the induction coil away from the crucible side walls means that a thick layer of solidified glass can be obtained on these side walls which reduces heat losses between the melting bath and the cooled crucible. This type of thermal insulation cannot be obtained for metals, which are good thermal conductors both in the liquid state and in the solid state.

For metals, the performances of this type of furnace are not very good compared with what can be obtained in conventional furnaces. However for glass, the performances of the furnace can be optimized by special sizing.

This invention is particularly aimed at a melting furnace for insulating materials comprising a cooled crucible with metal side walls, a partitioned and cooled bottom, and at least one induction coil placed under the bottom. The only means of heating is said induction coil and the metal side wall of the crucible is continuous.

According to one embodiment of this invention, the depth of the melting bath in the crucible and the excitation frequency of the induction coil are chosen such that said depth and said inside half-radius of the crucible are less than the thickness of the skin in the bath resulting from the excitation frequency of the induction coil.

According to one embodiment of this invention, the periphery of the induction coil is setback from the side wall of the crucible.

According to one embodiment OF this invention, the bottom is composed of tubes placed side by side.

According to one embodiment of this invention, the tubes are made of a material that is a good conductor or heat and a bad conductor of electricity.

According to one embodiment of this invention, the furnace comprises a metal base and lid which, together with the crucible to which they are connected, form a Faraday cage protecting the external environment from the radiation produced by the induction coil.

According to one embodiment of this invention, the furnace comprises several induction coils distributed under the bottom and controlled independently.

According to one embodiment of this invention, the furnace is rectangular shaped, and the induction coils are distributed along the long axis of the rectangle.

LIST OF FIGURES

These and other purposes, characteristics and advantages of this invention will be described in detail in the following non-restrictive description of specific embodiments with relation to the attached figures in which.

DETAILED DESCRIPTION OF SEVERAL EMBODIMENTS

Figure 1:
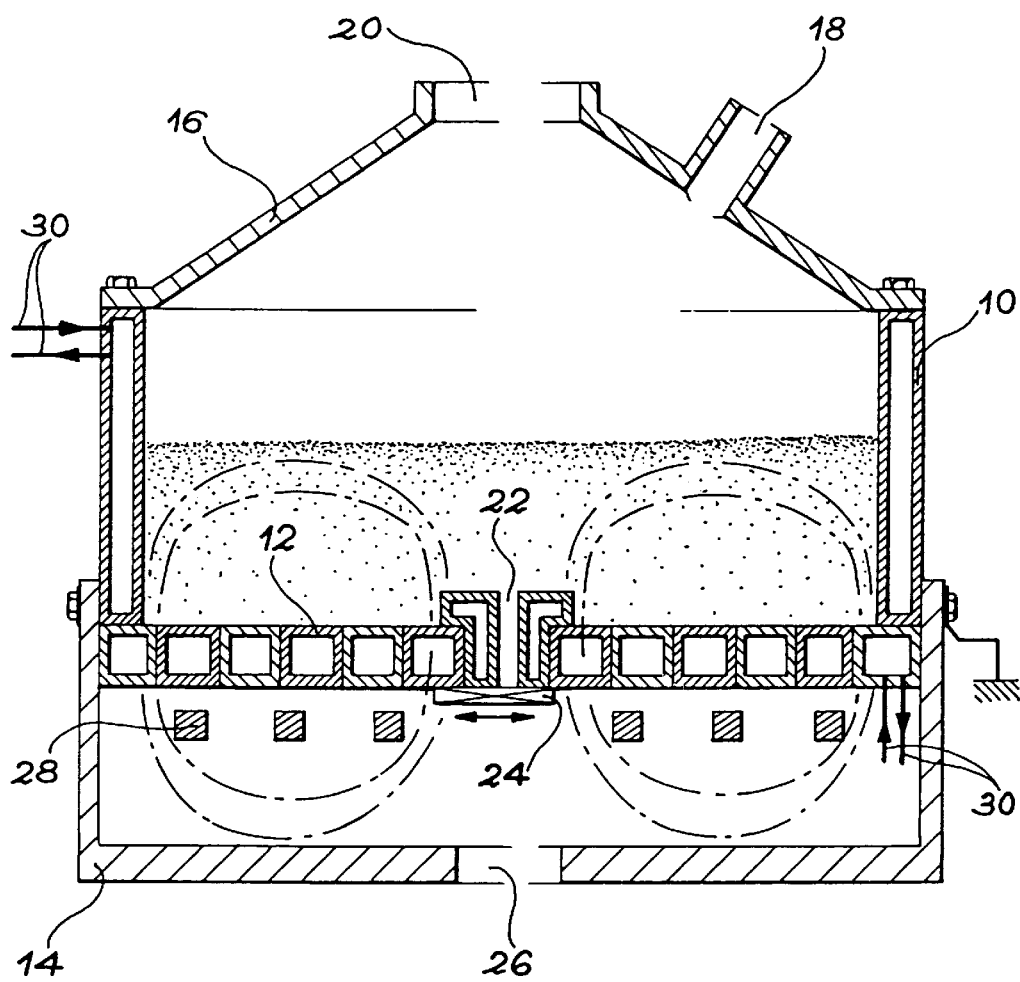
FIG. 1 shows an embodiment of the melting furnace according to this invention.

FIG. 1 shows an embodiment of a glass melting furnace according to the invention, and comprises a cooled crucible composed of a vertical ring segment 10 with a double metal wall placed on a horizontal bottom 12 transparent to the electromagnetic field. For example, this assembly may he placed on a bowl shaped base 14. It may be covered by a lid 16 that includes several access orifices, namely a material inlet orifice 18 and a combustion gas exhaust flue 20. For example, the bottom 12 may include a central outlet orifice 22 closed off by a withdrawable door 24. The base 14 then includes a corresponding outlet orifice 26.

The only induction heating element 28 is placed immediately under the bottom 12, inside tank 14. In this embodiment, this heating element is an induction coil with one or several turns.

The vertical ring segment 10 and the bottom 12 are each designed to enable circulation of cooling liquid which is shown by ducts 30 shown diagrammatically. The ring segment comprises continuous internal and external walls between which the cooling liquid circulates. Baffles may be provided between the two skins in order to homogenize cooling.

This type of ring segment 10 is particularly easy and inexpensive to make, compared with a partitioned ring segment in which relatively complex (trapezoidal) shaped sectors must be made beforehand and then assembled individually in a sealed manner using electrical insulation.

The induction coil 28 generates a field shown by chain dotted lines that pass through the bottom 12.

Only the bottom 12 is partitioned. As will be seen in more detail later, it is much easier to partition the bottom than to partition the side walls of a crucible.

The outside diameter of the induction coil 28 is less than the inside diameter of the ring segment 10, so that the electromagnetic field is low at the ring segment 10. The result is the temperature close to the ring segment wall is lover and the glass layer solidified on this wall is thicker. Since solid glass is a good insulator of heat, energy losses are significantly reduced. Note that this advantage cannot be obtained for metals which are good conductors of heat regardless of their phase.

The average diameter of the induction coil is about half the diameter of a conventional induction coil wound around the crucible, which significantly reduces its inductance and therefore its excitation voltage to transmit a given energy. This is particularly advantageous, particularly in the case of glass since the frequency of the excitation voltage is then particularly high. Thus for a given furnace diameter, the components of the converter supplying the induction coil excitation voltage may have a much lower breakdown voltage than in the case of a conventional furnace. Furthermore, the diameter of a furnace made with existing components can be greater than the diameter of a conventional furnace.

Note that for metals there are no particular problems in choosing the components in order to increase the furnace diameter, since the excitation frequency of the induction coil is much lower than for glass.

In an induction furnace for any type of material, an attempt is made to obtain good thermal efficiency. Due to the skin effect, the induced energy in the melting bath is maximum close to the induction coil and decreases quickly. It drops quickly beyond a distance called the skin thickness which, for a given material, depends only on the excitation frequency. The skin thickness reduces as the frequency increases.

Thus, energy concentrated by the skin effect must be transmitted to the rest of the bath by conduction and by convection. Therefore, it is beneficial to increase the skin thickness in order to improve uniformity of the temperature in the bath. However, the electrical efficiency drops when the skin thickness increases. Thus, a compromise has to be found between uniform heating and electrical efficiency.

Metal baths are usually fluid and have good thermal conductivity, which encourages uniform mixing by conduction and by convection. In a conventional furnace with an induction coil wound around the crucible, a good compromise is obtained when the skin thickness is less than a quarter of the inside radius of the melting crucible, to improve electrical efficiency.

Glass baths are usually viscous and thermal conductivity is bad, which makes it difficult to obtain a uniform temperature. A relatively high skin thickness has to be chosen. In a conventional furnace, a good compromise is obtained when the skin thickness is close to the inside radius of the crucible. The lower electrical efficiency compared with corresponding values possible for a metal bath due to the choice of a high skin thickness is compensated by the fact that molten glass has a much higher resistivity than metal. The electrical efficiency increases with the resistivity of the melting bath.

When an induction coil is used placed under the bottom as shown in FIG. 1, the skin effect occurs starting from the bottom 12, rather than from the wall of the ring segment 10. In order to maintain the compromises mentioned above, the excitation frequency or the induction coil 28 may be chosen such that the skin thickness is equal to half the skin thickness that would be chosen when the induction coil is wound around the crucible. Therefore for metals, the skin thickness would be chosen to be equal to one eighth of the inside radius or the crucible, whereas for glass it would be chosen to be equal to half the radius.

Thus, by placing the induction coil 28 under the melting bath, the skin thickness can be reduced by half, while maintaining the required thermal uniformity. The reduction in the skin thickness tends to increase the electrical efficiency.

However it is found that, unless specific precautions are taken, the thermal efficiency is less than the thermal efficiency of a conventional furnace with an induction coil wound around the crucible. The inventors realized that the efficiency varies as a function of the depth of the melting bath and that the optimum efficiency is obtained for a bath depth equal to or less than the skin thickness.

If accepted compromises are to be kept, the bath depth for metals must be chosen to be less than one eighth of the inside radius of the crucible. This gives unreasonable furnace proportions. Therefore, furnaces with heating through the bottom alone are not suitable for metals.

However for glass, and according to this invention, the bath depth is less than half of the radius which gives reasonable furnace proportions. As an illustration, FIG. 1 shows approximately the proportions necessary to obtain the optimum thermal efficiency in a glass melting furnace.

A furnace according to the invention has lower thermal losses than a conventional glass furnace with the same capacity. The solidified glass layer on the side walls is much thicker than in a conventional furnace since there is no heating source close to the side walls. There are still relatively high losses at the bottom but these are inevitable since, in a furnace according to the invention as in any conventional furnace, the bottom of the bath must be hot so that molten glass can be poured under good conditions.

According to one advantageous embodiment, the bottom 12 is made of tubes filled horizontally adjacent to each other and insulated from each other, in order to make it transparent to the magnetic field. As shown, the tubes preferably have a square cross-section so that the bottom of the crucible can be made flat.

One problem encountered in making the partitioned vertical walls of the crucible is to fix these sectors with respect to each other while sealing the space between sectors and providing electrical insulation. In the case of the bottom 12, this problem can easily be solved by partially casting the tubes 12 in concrete, the tubes being slightly separated from each other so that the concrete can provide insulation between the tubes. The induction coil 28 may also be cast in the concrete during the same operation.

The tubes may advantageously be made of a good thermal conducting material and a bad electrically conducting material such as a silicon carbide. If this type of material is used, in principle there is no need to partition the bottom, since it may then be composed of two plates between which the cooling liquid can circulate. However, these materials cannot be brazed or welded, which makes it difficult to seal the assemblies, particularly corner assemblies. However, it is always easy to provide a sealed assembly at the end of a tube. This type of end assembly will be used to connect tubes forming the bottom 12 in an "S" layout to enable circulation of the cooling liquid.

Preferably, the lid 16 and the tank 14 are made of an electrically conducting material which forms a Faraday cage protecting the external environment from magnetic radiation produced by induction coil 28.

Since there is no induction coil wound around a crucible according to the invention, the shape of the crucibles may be arbitrary. It is preferably cylindrical if a single induction coil is used, which simplifies its manufacturing. But its shape may be adapted to a specific layout of several induction coils in order to increase the capacity of the furnace or to carry out special treatment. In this case, the depth of the bath and the excitation frequency are chosen considering the radius corresponding to the average circumference of the area covered by each induction coil.

Figure 2:
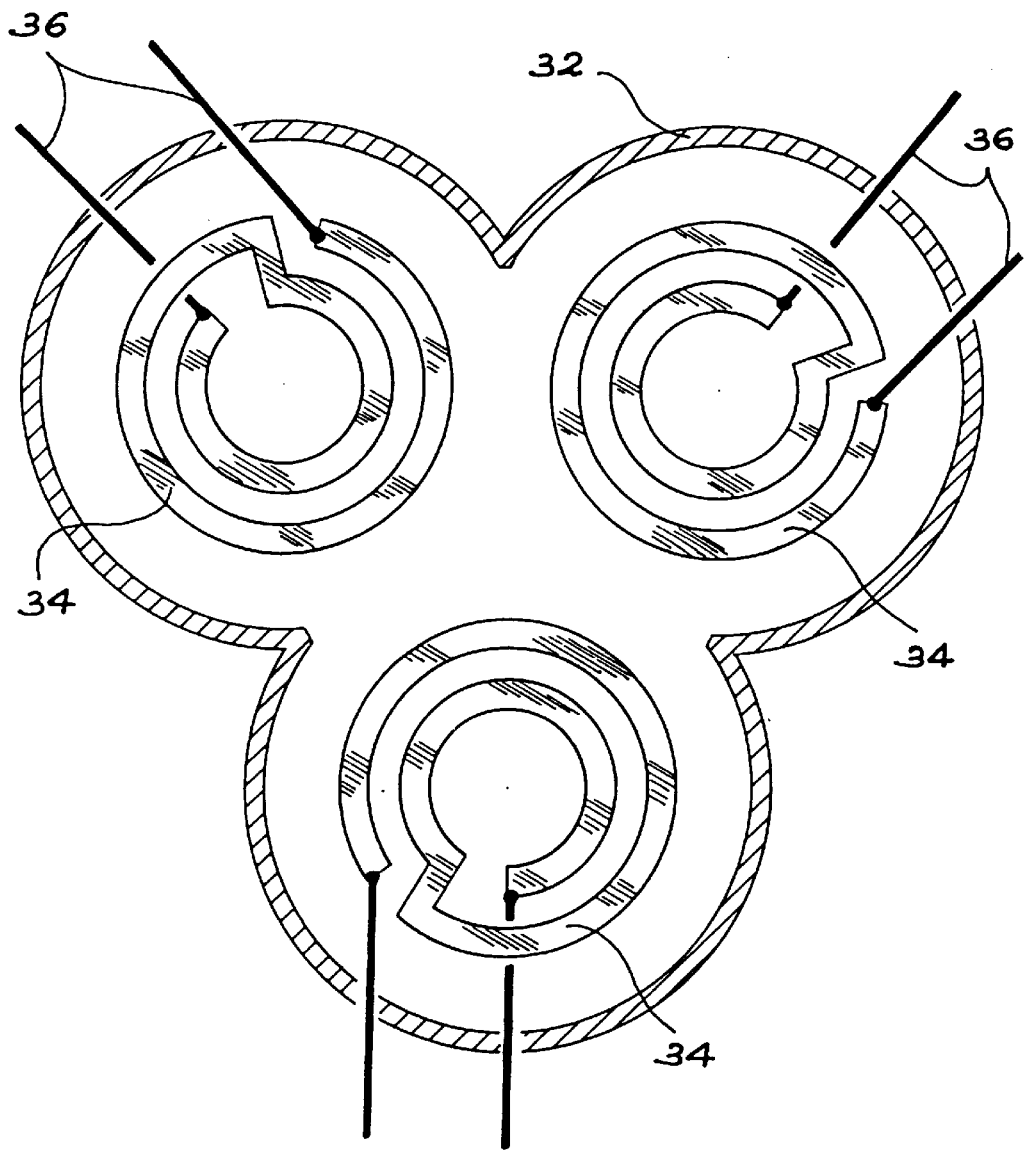
FIG. 2 shows an first alternative of the melting furnace according to this invention.

FIG. 2 illustrates a first example of a furnace with several induction coils according to this invention. The cross section of the crucible 32 of the furnace is made by combining three cylinders, each of which has a spiral induction coil 34 at its bottom powered by two conductors 36. It is thus possible to design a high capacity furnace, or a furnace with several areas in which the temperatures are controlled independently, so that different melting and pouring temperatures can be obtained.

This type of furnace facilitates refining operations when melting glass.

Figure 3:
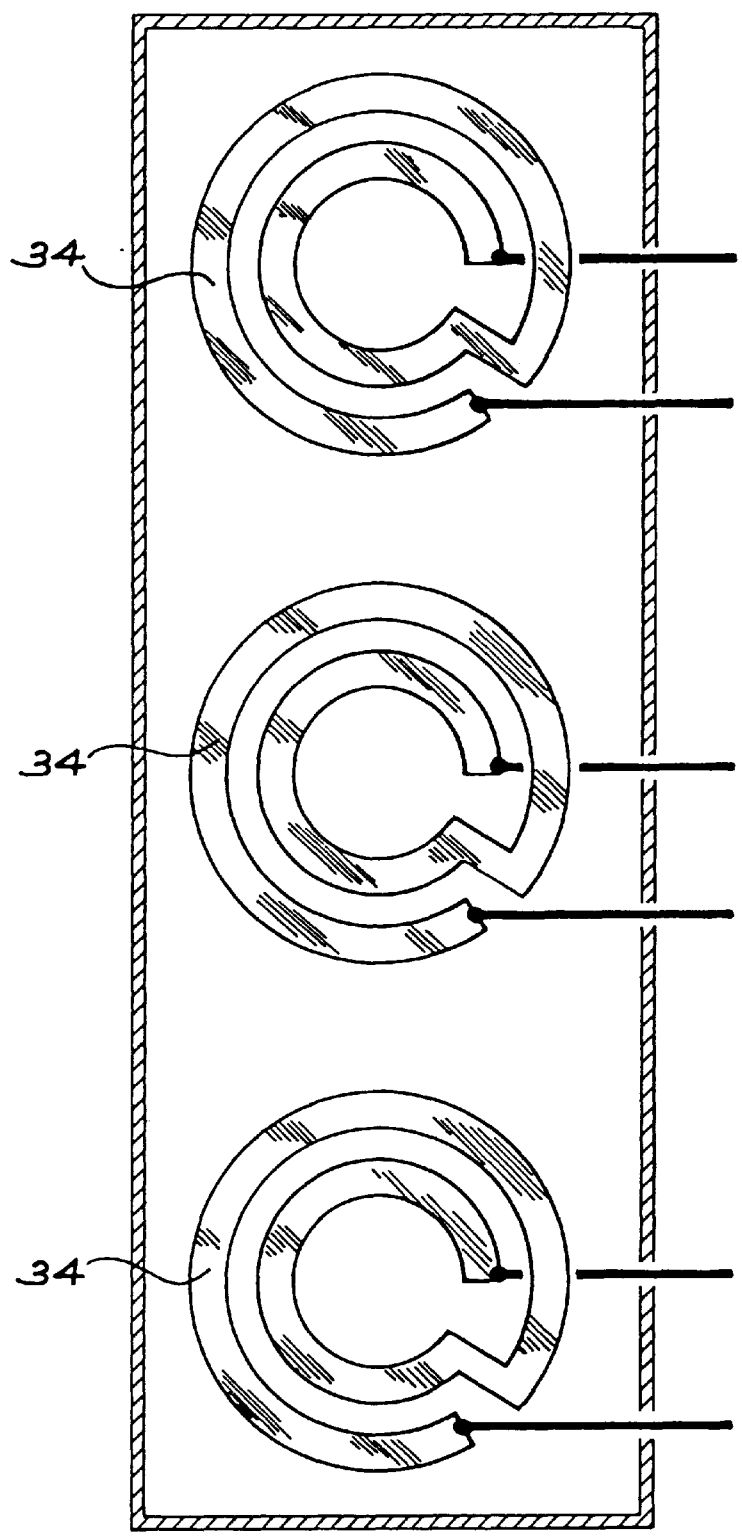
FIG. 3 shows a second alternative of the melting furnace according to this invention.

FIG. 3 illustrates a second example of the furnace according to the invention, which is more particularly adapted to glass refining. The shape of the furnace is rectangular, and the induction coils 34 are controlled independently, and are placed along the main axis of the rectangle. One of the end induction coils, for example the induction coil close to where the glass to be melted will be poured, will be excited to output the highest energy, whereas the other induction coils will be excited to output decreasing energies, the refined glass being drawn off at the induction coil with the lowest excitation.

This furnace configuration is ideally similar to that used in conventional glass furnaces heated by flames.

In the furnaces with multiple induction coils mentioned above, the induction coils must be sufficiently close to each other to provide homogenous action, but sufficiently far away so that they do not interfere with each other.

An expert in the subject will easily see many variants and modifications of this invention. Although the described applications are related to glass, it is obvious that a furnace according to the invention is applicable to any material with low electrical and thermal conductivity in the liquid state.

What is claimed is:

1. Melting furnace for insulating materials, comprising a cooled crucible (10, 32) with metal side walls, a partitioned and cooled bottom (12) and at least one induction coil (28, 34) serving as a heating means and placed under the bottom; characterized in that said at least one induction coil is the only means of heating and that the metal side wall of the crucible is continuous.

2. Melting furnace according to claim 1, wherein the induction coil has an excitation frequency and wherein the crucible has a half inside radius configured to contain a melting bath therein, the melting bath having a depth and a skin thickness selected such that said depth and half inside radius of the crucible are less than the skin thickness in the bath resulting from the excitation frequency of the induction coil (28, 34).

3. Melting furnace according to claim 1, characterized in that the induction coil (28, 34) has a periphery which is set back from the side wall of the crucible (10, 32).

4. Melting furnace according to claim 1, characterized in that the bottom (12) is composed of tubes placed side by side.

5. Melting furnace according to claim 4, characterized in that the tubes are made or a material that is a good conductor of heat and a bad conductor of electricity.

6. Melting furnace according to claim 1, characterized in that it comprises several induction coils (34) distributed under the bottom and controlled independently.

7. Melting furnace for insulating materials, comprising a cooled crucible (10, 32) with metal side walls, a partitioned and cooled bottom (12) and at least one induction coil (28, 34) serving as a heating means and placed under the bottom; characterized in that the melting furnace comprises a metal base (14) and a metal lid (16) which, together with the crucible (10, 32) to which they are connected, form a cage protecting the outside environment from radiation generated by the induction coil (28, 34) and wherein said at least one induction coil is the only means of heating and that the metal side wall of the crucible is continuous.

8. Melting furnace for insulating materials, comprising a cooled crucible (10, 32) with metal side walls, a partitioned and cooled bottom (12) and at least one induction coil (28, 34) serving as a heating means and placed under the bottom; characterized in that the melting furnace has a rectangular shape with a continuous metal side wall and wherein said at least one induction coil is the only means of heating and distributed along the long axis of the rectangle and controlled independently.

* * * * *